Nov. 10, 1936.   R. HARROUN   2,060,731
AUTOMOBILE CONTROL MECHANISM
Filed Oct. 9, 1933   2 Sheets-Sheet 1
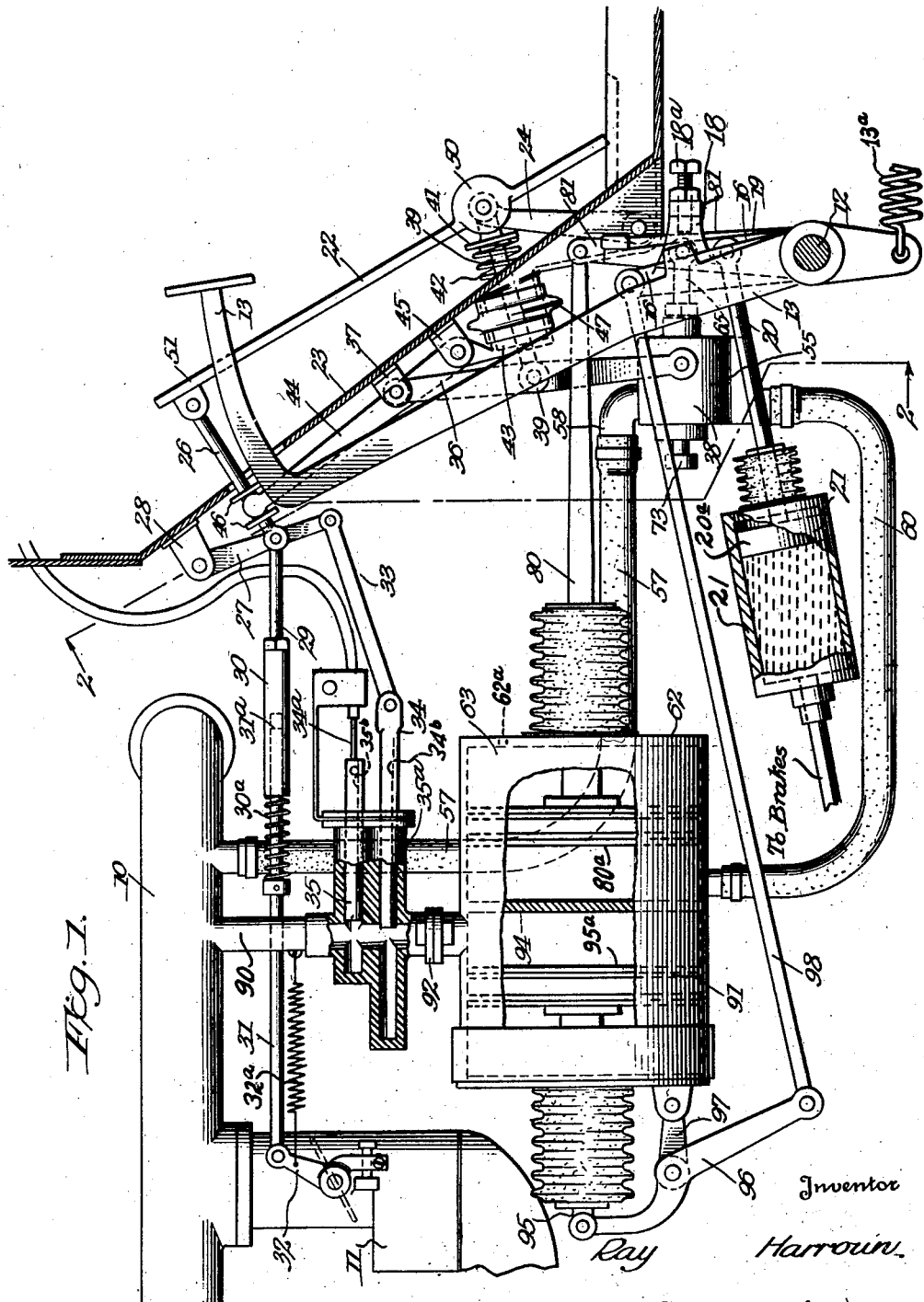
Inventor
Ray Harroun.

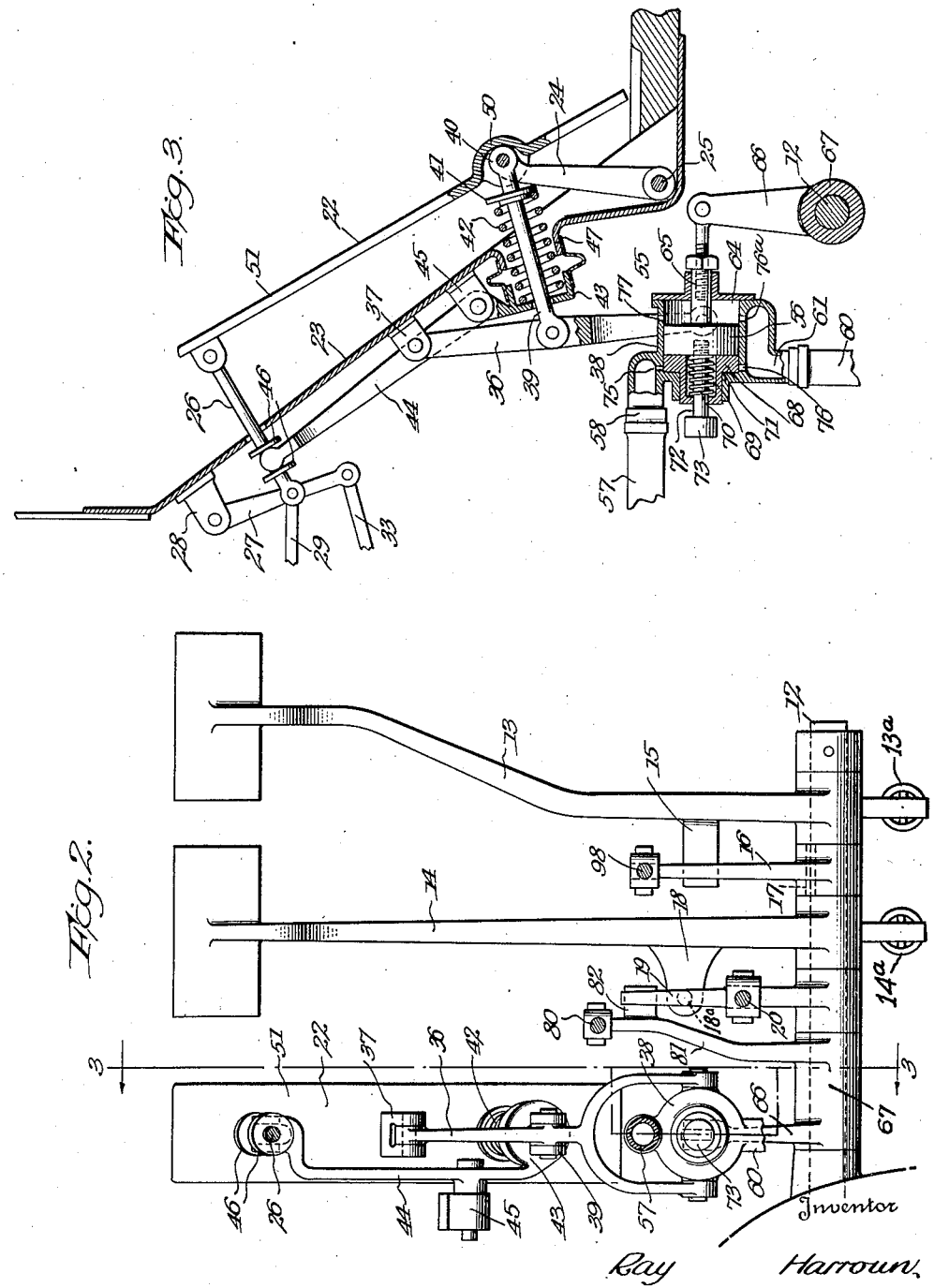

Patented Nov. 10, 1936

2,060,731

UNITED STATES PATENT OFFICE 2,060,731

AUTOMOBILE CONTROL MECHANISM

Ray Harroun, Detroit, Mich., assignor of sixty-eight and seventy-five one-hundredths per cent to Michael J. Glenn, Indianapolis, Ind.

Application October 9, 1933, Serial No. 692,893

6 Claims. (Cl. 192—3)

The present invention relates to an automobile control mechanism.

Control mechanisms for automobiles whereby the various controlling devices of the automobiles, i. e., the throttle valve and brake, may be selectively operated, have heretofore been provided. However, it is very often desirable to simultaneously operate both the throttle valve and the brake. For example, when the vehicle is standing upon an incline, it is of advantage to be able to actuate both the throttle valve and the brake at the same moment.

The principal object of the present invention is to provide a control mechanism for automobiles whereby the throttle valve and brake may be controlled either selectively or simultaneously.

The control mechanism is so constructed that its actuating movements will be in accordance with the natural and instinctive movements of the driver's foot and, in normal operation, there will be no possibility of the control being operated in an incorrect manner. In order to further prevent incorrect operation, the invention includes an arrangement of the control such that operation of the control to actuate either the throttle valve or the brake mechanism will cause resistance to be developed against the operation of the other mechanism. This arrangement is particularly desirable in that it will prevent the driver, in a moment of excitement, from accidentally misdirecting the effort of his foot to cause the operation of the throttle valve instead of the brake, and vice versa.

Another important object of the invention is to provide a control mechanism of this general type which includes an operating member or pedal so constructed that it will guide the positioning of the operator's foot thereon with the result that there will be no possibility of the foot being improperly positioned upon the control pedal.

Another object of the invention is to provide a novel form of brake actuating mechanism which is so constructed that too great or sudden a movement of the brake control will cause a commensurate reaction to be developed in the braking mechanism, thereby preventing damage to the automobile and injury to its occupants. The braking mechanism of the invention is also arranged in such a manner that a portion of the force exerted in applying the brakes will be borne by the operator.

Still another object of the invention is to provide a control mechanism for the throttle valve and brake which will operate the clutch with the throttle valve in proper sequence.

Still other objects and advantages of the invention will be apparent from the following specification, in which:

Figure 1 is a view in side elevation showing the mechanism of my invention applied to an automobile, Figure 2 is a transverse elevation taken on the line 2—2 of Figure 1 and looking in the direction of the arrows, and Figure 3 is a view at right angles to that of Figure 2, taken on the line 3—3 of Figure 2 and looking in the direction of the arrows.

The numeral 10 designates an intake manifold to which a carburetor 11 is connected in the usual manner. A clutch operating shaft is indicated by the numeral 12 and, as best shown in Figure 2, a clutch operating pedal 13 and a brake operating pedal 14 are positioned upon this shaft, the shanks of both pedals including sleeves which encircle the shaft. The clutch operating pedal has a lateral projection 15 on its shank and a clutch arm 16 is keyed to the shaft 12 adjacent the pedal 13 in the path of movement of the projection. Pressure exerted upon the clutch pedal 13 will cause the lateral projection 15 on its shank to move the arm 16 forwardly to partially rotate the clutch operating shaft. The brake pedal 14 includes a lateral projection 18 on its shank. A brake arm 19 is positioned on the shaft 12 adjacent the brake pedal 14 and in the path of movement of the projection 18, the arm 14 including a sleeve portion which encircles the shaft. Projection 18 is provided with an adjusting screw 18a to permit variance of the moment of contact of projection 18 with arm 19. When the brake pedal is moved forwardly, the lateral projection 18 thereon will move the arm 19 forwardly. The arm 19 is provided intermediate its length with a swivel connection to a rod 20 which extends into a fluid pressure brake cylinder 21 and there carries a piston 20a by means of which fluid in the cylinder 21 may be acted upon to actuate the brakes in well known manner.

Suitable means such as springs 13a and 14a respectively, may be provided to hold the brake and clutch pedals 13 and 14 in position to operate the brake arm 19 and clutch arm 16, respectively.

The automobile clutch and brakes may be actuated by the pedals 13 and 14 but are ordinarily controlled through a separate control pedal through connections which will now be described.

A control member or pedal 22 is mounted adjacent the floor board 23 of the automobile, the pedal 22 normally extending substantially parallel with the floor board. The control pedal 22 is pivoted adjacent its lower end upon a link 24, the lower end of the link being pivotally connected to the floor board or its supporting structure at 25. A second link 26 is pivotally connected to the upper end of the control lever 22 and extends through the floor board to a lever 27 having one end thereof pivotally supported in a bracket 28 beneath the floor board. The link 26 is pivotally connected to the lever 27 intermediate the ends of the latter and a rod 29 extends forwardly from this point of connection and is connected at its opposite end, through a lost motion device 30 including a spring 30a, to a rod 31 having its further end joined to the throttle valve arm 32 of the carburetor 11. A return spring 32a is provided on the throttle arm. The lower end of the lever 27 is connected by means of a link 33 to a controlling member 34 which operates an automatic clutch controlling valve 34 of the usual type within a casing 35a.

A lever 36 has its upper end pivoted between lugs 37 on the lower surface of the floor board 23, the lower portion of this lever being bifurcated to pivotally support a reaction valve casing 38. Intermediate its length, the lever 36 has a link 39 pivotally connected thereto, the link extending through the floor board and having its opposite end pivotally connected to the control pedal 22 at the point 40 at which the link 24 is connected to the control pedal. The link 39 is provided with a shoulder 41 and a coil spring 42 surrounds the link beneath the shoulder. The opposite end of the coil spring 42 bears upon a socket 43 formed at the lower end of an equalizing lever 44 pivotally supported upon the lower surface of the floor board upon a lug 45 which is preferably closely adjacent the socket 43. The opposite end of the equalizing lever 44 is preferably bifurcated, the bifurcated portion bearing upon spaced shoulders 46 formed on the link 26. In order to completely enclose the coil spring 42 with respect to the engine compartment of the automobile, the aperture in the floor board through which the spring extends is flanged as shown at 47 and a flexible covering joins the flange 47 and the socket 43 of equalizing lever 44.

As shown in Figures 1 and 2, the control pedal 22 is provided with a hump or up-struck portion 50 at the point where the links 24 and 39 are connected thereto, this being the point at which the instep of the shoe of the driver would be positioned during the operation of the pedal. This construction greatly assists the driver in properly positioning his foot upon the pedal 22.

By the control pedal construction above described and by means of the connections thereto, pressure upon the upper portion 51 of the pedal will cause the throttle valve of the carburetor to be actuated to a degree corresponding to the pressure exerted upon the upper portion of the pedal. Actuation of the throttle valve will also control the clutch of the vehicle in a manner hereinafter described. In order to apply the brakes of the vehicle, the driver would permit the upper portion 51 of the pedal to move outwardly to normal position and would exert pressure upon the lower portion of the pedal, i. e., the portion adjacent the hump 50. Pressure exerted adjacent the hump portion 50 will cause the link 39 to be moved inwardly to operate the brake control valve casing 38, which, in turn, will actuate the brakes in a manner hereinafter described.

It will be noted that forward pressure exerted upon the upper end 51 of the control pedal 22 will move the upper end of the equalizing lever 44 inwardly (to the left in the drawings) so that the equalizing lever 44 will swing upon its pivot at 45 with the result that its lower or socketed end will move outwardly or to the right. The movement of the socketed portion 43 to the right will, through the medium of coil spring 42, tend to move the lower portion of the control pedal 22 outwardly or to the right. By this arrangement, inward pressure upon the upper end 51 of the control pedal 22 will operate the throttle valve arm 32 of the carburetor and the pressure exerted upon the upper portion 51 of the pedal will tend to hold the lower or brake actuating portion of the pedal in non-actuating position.

When the lower portion 50 of the control pedal 22 is pressed inwardly by pressure exerted at that point alone, the inward movement of the link 39 will tend to move the lower or socketed end 43 of the equalizing lever 44 inwardly or to the left by means of the compression effort exerted by the coil spring 42 upon the socket 43. This movement of the lower end of the equalizing lever 44 to the left will swing the upper portion of this lever to the right or outwardly so that the upper end 51 of the control pedal 22 will be retained in normal outward position.

From the above, it will be clear that a control pedal 22 is provided for operating two separate controls from different portions thereof, the pedal and its operating connections being so arranged that movement of the pedal to operate one control will resist simultaneous actuation of the other control.

On some occasions, as when the car is standing upon an incline, it may be desirable to simultaneously actuate the throttle valve and the brakes. This can readily be accomplished through the control pedal 22, although such action will be opposed by an increased resistance of the spring 42 due to the fact that the inward movement of the upper portion of the control pedal 22 will, through the equalizing lever 44, exert pressure upon the inner end of the spring 42 while the simultaneous inward movement of the lower end of the control pedal 22 will also exert pressure upon the opposite end of the spring 42. However, sufficient pressure over the entire area of the control pedal 22 will actuate both the throttle valve and the brake.

Should the driver become excited during an emergency requiring the sudden stopping of the vehicle, he would, by instinct, exert greater pressure upon the lower portion of the control pedal 22 and this would cause the brakes to be actuated in the proper manner. Even if the driver should, at such a time, accidentally exert pressure too high up upon the pedal 22, so that the control pedal might tend to actuate the throttle valve, the inward movement of the upper end of the control pedal would be resisted by the greater pressure naturally exerted upon the pedal adjacent the hump 50, compressing the spring 42 and thereby resisting inward movement of the upper end of the equalizing lever 44.

It will be noted that the mounting of the control pedal 22 is such that when pressure is applied over the entire area of the pedal, it will move inwardly in a position substantially parallel to the floor board. Also, the fulcrum of the pedal is such that its lower portion will move in accordance with the instinctive movement of the driver's foot and so that the upper portion will not be moved inwardly by pressure upon the lower portion, and vice versa.

The brake controlling valve 55, the casing 38 of which is pivotally supported at the lower end of the lever 36, is shown in detail in Figure 3 and comprises the casing member 38 and a valve member 56. A flexible tube 57 is secured at one end to an inlet connection 58 in the casing 38 and is secured at its opposite end to the intake manifold 10. A second flexible tube 60 extends from an outlet connection 61 of the casing 38 to a brake operating chamber 62 of a cylinder 63. The valve casing 38 has a cylinder 64 formed therein and the valve member 56, preferably in the form of a piston, fits within the cylinder 64. A piston rod 65 on the piston is joined by an adjustable connection to an arm 66 integral with a sleeve 67 mounted on the clutch operating shaft 12, as shown in Figure 2.

The valve or piston 56 carries a head portion 68 which is provided with a central bore 69 in which is mounted an expansible spring 70. The head portion 68 of the valve is stepped as shown at 71, the stepped portion projecting into a reduced bore in the casing 38. A stud 72 fixed in the valve or piston 56 extends through the central bore 69 of the head portion 68 and through an aperture therein to the exterior of the head 68. The outer end of the stud 72 is enlarged, as shown at 73.

A port 75 opens from the inlet connection 58 to the interior of the cylinder 64, the port being positioned opposite the normal position of the head portion 68 of valve or piston 56. The outfeed connection 61 communicates with the interior of the cylinder 64 by a port 76 positioned opposite or aligned with the inlet port 75. A second port 76a opens from the outlet connection 61 to the opposite end of the cylinder 64 and an outlet to atmosphere from the cylinder 64 is provided by means of a port 77 aligned with the port 76a.

When the brakes of the automobile are not applied, the valve or piston 56 and the head portion 68 will be in the position shown in Figure 3. At this time, the ports 75 and 76 will be closed because of the position opposite them of the valve head portion 68. The port 77, being open to atmosphere, will permit the presence of atmospheric pressure in the end of the cylinder 64 behind the valve 56. The brake operating chamber 62, through port 76a, outlet connection 61 and tube 60, will also be open to atmosphere.

To actuate the brakes through the control pedal 22, the lower end 50 of the control pedal 22 is depressed. This will swing the lower end of the link 36 inwardly (to the left in Figure 3) carrying the valve casing 38 of the brake controlling valve 55 to the left, but the valve or piston 56 will be held stationary by reason of its connection with the arm 66. The coil spring 70 will cause the valve head portion 68 to move to the left with the casing 38, thereby maintaining the ports 75 and 76 closed. Continued movement of the casing 38 to the left will cause the valve head portion 68 to abut against the head 73 of the stud 72 fixed to the valve or piston 56, which is still held stationary. Thereafter, further movement of the casing 38 to the left will cause the valve or piston 56 to close the ports 76a and 77, while the ports 75 and 76 will be uncovered. Closing of the ports 76a and 77 will close the valve casing 38 to atmosphere and opening of the ports 75 and 76 will permit the suction from the intake manifold 10 to be effective, through tube 57, casing 38 and tube 60, upon the brake operating chamber 62. The suction in the brake chamber 62 will act upon a piston 80a in that cylinder to draw the latter inwardly or to the left, thereby also moving its piston rod 80 to the left. The chamber 62 is provided with a vent 62a to atmosphere to permit this movement of the piston 80a.

The piston rod 80 is connected at its outer end to an arm 81 integral with the sleeve 67 on the clutch operating shaft 12. The arm 81 includes a lateral projection 82 which extends behind the brake arm 19 (as shown in Figure 2), to which arm is connected the rod 20 extending into the brake cylinder 21. Hence, the movement of the piston rod 80 to the left will cause the rod 20 to be moved in the same direction to actuate the brakes.

As has been stated above, the arm 81 to which the piston rod 80 is connected is carried by the same sleeve 67 on the clutch operating shaft 12 which carries the arm 66 which is connected to the valve or piston 56 of the brake control valve 55. It has been explained above that the movement of the lower portion 50 of the control pedal 22 will move the casing 38 of the brake control valve 55 to the left and away from the valve or piston 56, thereby opening the suction ports 75 and 76. However, when the suction controlled by valve 55 becomes effective in the brake chamber 62 to move the piston rod 80 to the left, the resulting movement of the arm 81 to the left will swing the arm 66 in the same direction, thereby causing the valve or piston 56 to move in that direction. Movement of the valve or piston 56 to the left will tend to uncover the ports 77 and 76a to atmosphere and to cover or close the suction ports 75 and 76 with the result that the braking action will be decreased because the suction effort in the brake chamber 62 upon the piston or piston rod 80 will be reduced.

It will be observed from the above that the brake control valve 55 and the connections thereto cause the brakes to be moved to braking position and, at the same time. prevents the brake from being too suddenly applied. In other words, the brake control valve follows up the movement of the control pedal 22 and decreases the suction effort in the brake chamber 62 to a degree predetermined by the amount of pressure on the control pedal 22. Another result of this mode of operation will be to cause some of the resistance encountered in braking to be met by the operator's foot upon the control pedal 22.

The connections whereby the control pedal 22 operates the throttle valve of the carburetor 11 are operatively connected to an arrangement for automatically controlling the clutch in accordance with the operation of the throttle valve. The means whereby this dual control is accomplished is as follows: The clutch controlling valve generally indicated by the numeral 35 is of the usual type for controlling suction to operate the clutch. The valve 35 may be controlled from the dash to be either operative or inoperative with the control pedal 22 by means of a control cable 34a extending to the dash from the valve 35 through a flexible tubing. The valve 35 communicates with the intake manifold 10 through a tube 90 and communicates with a clutch operating chamber 91 in the cylinder 63 by means of a connection 92. When the valve 35 is positioned to close tube 90, it will be in inoperative position, that is, the suction effect will be discontinued, atmospheric pressure then flowing to chamber 91 through valve groove 35b. The cylinder 63 is divided into the two chambers 62 and 91 by means of a partition 94.

A piston 95a is positioned within the clutch operating chamber 91 and is provided with a piston rod 95 which extends through the end wall of the chamber 91 and is pivotally connected to a lever 96, which lever is fulcrumed intermediate its ends upon a link 97 pivotally supported upon the end wall of the chamber 91. The free end of the lever 96 is connected by means of a rod 98 with clutch arm 16 on the clutch operating shaft 12. As has been explained above, the arm 16 is keyed to the clutch operating shaft.

When the upper end 51 of the control pedal 22 is in the position shown in Figure 1 of the drawings, that is, in its extreme outward position, the throttle valve is in idling position. At this time, the clutch will be in disengaged position, assuming that the automatic clutch controlling valve 35 is in operation. When the upper end 51 of the control pedal 22 is depressed, it will, through the link 26, cause the rod 29 to be moved forwardly (to the left in the drawings) toward contacting position with the inner end 31a of the rod 31 which is connected to the arm 32 of the throttle valve. However, because of the lost motion connection 30 between the rods 29 and 31, the throttle valve arm will not then move. The inward movement of the link 26 will swing the lever 27 upon its pivot 28 and the link 33 connected to the free end of the latter lever will move the control valve member 34 to the left. This member, moving to the left, will close passage 90 to release the suction in the clutch operating chamber 91, atmospheric pressure then flowing to chamber 91 through valve groove 34b permitting the piston and piston rod 95 to move outwardly or to the left, with the result that the lower end of the lever 96 will move to the right, giving the arm 16 keyed to the clutch operating shaft 12 a similar movement to actuate the clutch to operative or engaged position. At about the same moment, the lost motion between the throttle control rods 29 and 31 will be taken up in the lost motion connection 30 and the throttle valve will move to the desired position in accordance with the position of the upper end 51 of the control pedal 22.

When the upper end 51 of the control pedal 22 is permitted to move outwardly or to the right to close the throttle valve, this movement of the control pedal 22 will, through the link 26, lever 27 and link 33, move the controlling member 34 of the automatic clutch control valve 35 to the right. This will cause the suction of the intake manifold to be effective in the clutch chamber 91 of cylinder 63 so that the piston and piston rod 95 will be drawn inwardly or to the right. This movement of the piston rod 95 will swing the lower end of the lever 96 to the left, resulting in a similar movement of the arm 16 on the clutch operating shaft 12, thereby disengaging the clutch. At the same moment, the throttle valve will move to idling position.

The simultaneous operation of the brakes and throttle valve, with the clutch, will be apparent from the above explanations of the selective operation of the brakes and the throttle valve and clutch.

When the clutch arm 16 is in extreme position to the right, and the clutch is thereby in engaging position, the clutch arm 16 may be moved to inoperative position by means of the manual clutch pedal 13, because of the engagement of the lateral extension 15 on the shank of the pedal with the arm 16. The brakes of the automobile may also be manually actuated by operation of the brake pedal 14, the lateral projection 18 of the latter contacting on such movement, with the brake arm 19. In such usual operation of the brake pedal 14, the automatic brake controlling valve 55 will not be actuated because the brake arm 19 will move forwardly to braking position without affecting the position of the arm 81.

Suitable covers may be placed upon the rods 29, 80, and 95 to close the joints between these rods and the outer faces of the cylinders in which they operate.

It will be understood that the invention is not limited to the details of construction shown in the drawings and described in the specification and that the examples of the use of the device which have been given do not include all of the uses of which the device is capable; also, that the phraseology employed in the specification is for the purpose of description and not of limitation.

I claim:

1. The combination with an automobile including a plurality of controlling mechanisms therefor, of a supporting element movably mounted on the frame of the automobile, means for operating said controlling mechanisms, and connections extending from a plurality of points on said means to said respective controlling mechanisms, said means being supported at the free end of said element to permit said connections to said controlling mechanisms to be operated either simultaneously or selectively.

2. The combination with an automobile including a plurality of controlling mechanisms therefor, means to operate said controlling mechanisms comprising a pedal, connections to said controlling mechanisms extending from longitudinally spaced points on said pedal, means pivotally connected to the automobile frame and co-acting with said connections to support said pedal, said supporting means and said connections being so arranged that the pedal will move in a path conforming to the natural movements of the operator's foot.

3. The combination with an automobile, including a plurality of controlling mechanisms therefor, of means to operate said controlling mechanisms, connections between said means and said controlling mechanisms, said means having operative engagement with said connections to permit said controlling mechanisms to be operated either simultaneously or selectively, and means actuated upon selective operation of said first named means to prevent operation of the non-selected mechanism.

4. The combination with an automobile, including carbureting apparatus and braking apparatus, of controlling means for said apparatuses, connections between said controlling means and said apparatuses, said controlling means having operative engagement with said connections to permit said apparatuses to be controlled either simultaneously or selectively, and means actuated upon selective operation of said first named means to prevent operation of the non-selected apparatus.

5. The combination with an automobile including a plurality of controlling mechanisms therefor, of a supporting element movably mounted on the frame of the automobile, means for operating said controlling mechanisms, connections extending from a plurality of points on said means to said respective controlling mechanisms, said means being supported at the free end of said element to permit said connections to said controlling mechanisms to be operated either simultaneously or selectively, and means actuated upon selective operation of said first named means to prevent operation of the non-selected controlling mechanism.

6. The combination with an automobile including a carburetor and brakes, of a link pivotally connected to the frame of the automobile, a control pedal pivotally mounted at the free end of said link, connections extending from longitudinally spaced points on said control pedal to the carburetor and brakes, respectively, to permit the carburetor and brakes to be actuated either simultaneously or selectively, and means actuated upon selective operation of said control pedal to prevent operation of the non-selected connection.

RAY HARROUN.